US006763333B2

(12) United States Patent
Jones et al.

(10) Patent No.: US 6,763,333 B2
(45) Date of Patent: *Jul. 13, 2004

(54) APPARATUS AND METHOD FOR MONITORING PROGRESS OF CUSTOMER GENERATED TROUBLE TICKETS

(75) Inventors: William R. Jones, St. Louis, MO (US); David H. Bollinger, St. Louis, MO (US); Jeffrey S. Lindgren, St. Louis, MO (US)

(73) Assignee: SBC Technology Resources, Inc., Austin, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 09/732,893

(22) Filed: Dec. 11, 2000

(65) Prior Publication Data

US 2001/0001143 A1 May 10, 2001

Related U.S. Application Data

(63) Continuation of application No. 09/050,990, filed on Mar. 31, 1998, now Pat. No. 6,219,648.
(60) Provisional application No. 60/042,197, filed on Mar. 31, 1997.

(51) Int. Cl.[7] .............................................. G06F 17/60
(52) U.S. Cl. .................... 705/8; 705/1; 705/9; 700/80; 714/100.05; 714/100.06; 714/130; 714/134; 340/506; 340/527
(58) Field of Search ...................... 705/1, 8, 9; 700/80; 714/48, 52; 379/100.05, 100.06, 130, 134; 340/506, 527

(56) References Cited

U.S. PATENT DOCUMENTS

| 4,916,733 A |   | 4/1990 | Smith et al. ................ 379/132 |
| 5,463,768 A | * | 10/1995 | Cuddihy et al. .............. 714/37 |
| 5,692,030 A |   | 11/1997 | Teglovic et al. ............... 379/14 |
| 5,721,913 A |   | 2/1998 | Ackroff et al. ............. 707/103 |
| 5,778,049 A |   | 7/1998 | Young et al. ............. 379/15.03 |
| 5,926,100 A |   | 7/1999 | Escolar .................... 340/691.3 |
| 5,946,372 A |   | 8/1999 | Jones et al. .............. 379/10.01 |
| 6,032,184 A | * | 2/2000 | Cogger et al. .............. 709/223 |

FOREIGN PATENT DOCUMENTS

| EP | 0 712 227 A2 * | 5/1996 | ............ H04M/3/30 |

OTHER PUBLICATIONS

Kobielus, J., "Management The United Way", Network World, vol. 12, No. 32, pp. 37–40, Aug. 7, 1995.

* cited by examiner

*Primary Examiner*—Raquel Alvarez
(74) *Attorney, Agent, or Firm*—Greenblum & Bernstein, P.L.C.

(57) ABSTRACT

An alerting system is provided for proactively ensuring awareness of pending customer generated trouble tickets which have not been resolved for at least a predetermined time duration corresponding to an escalation level. A customer service center selects the time duration. The alerting system includes a manager module which periodically monitors the pending customer generated trouble tickets and determines whether each pending customer generated trouble ticket remains unresolved for the time duration corresponding to the escalation level. The alerting system also includes an alerting module which sends an alert to a recipient assigned to the escalation level when the manager module determines the pending customer generated trouble ticket has not been resolved for the time duration corresponding to the escalation level. The alerting system may also include a parsing module which parses the pending customer generated trouble tickets to remove extraneous and invalid information. The parsing module also organizes the pending customer generated trouble tickets into data records according to a predefined format. Subsequently, the parsing module transmits to the manager module at a predefined interval, the data records for monitoring by the manager module.

18 Claims, 4 Drawing Sheets

APPARATUS AND METHOD FOR MONITORING PROGRESS OF CUSTOMER GENERATED TROUBLE TICKETS

CROSS REFERENCES TO RELATED APPLICATIONS

This application is a continuation of U.S. patent application Ser. No. 09/050,990, filed Mar. 31, 1998, now U.S. Pat. No. 6,219,648 to JONES et al., and this application claims the benefit of U.S. provisional patent Application No. 60/042,197 entitled "Apparatus and Method for Monitoring Progress of Customer Generated Trouble Reports," filed Mar. 31, 1997, the disclosures of which are expressly incorporated herein by reference in their entireties.

BACKGROUND OF THE INVENTION

1. Field of the Invention

The present invention generally relates to the field of telecommunications. More particularly, the present invention relates to management systems or tools for monitoring customer or subscriber generated trouble reports in a telecommunications services environment.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Advanced Interactive executive (AIX)
Electronic Bonding (EB)
Local Area Network (LAN)
Manager Scratch Pad (MSP)
Online Query System (OQS)
Operational Support System (OSS)
Private Branch Exchange (PBX)
Transmission Control Protocol/Internet Protocol (TCP/IP)
Work and Force Administration (WFA)
Work and Force Administration-Control (WFA/C)

OBJECTS AND SUMMARY OF THE PRESENT INVENTION

The present invention, through one or more of its various aspects and/or embodiments is presented to accomplish one or more objectives and advantages, such as those noted below.

A general object of the present invention is to provide an apparatus and method for monitoring customer or subscriber generated trouble reports or tickets within a telecommunications services environment.

Further, an object of the invention is to provide an apparatus and method that ensures awareness of trouble conditions or outages, and that offers escalated service restoration on a proactive basis.

Another object of the invention is to reduce the presence of long duration (or old) trouble reports, and to improve the service provided to customers, such as Interexchange Carrier customers and other special service (e.g., private line) customers.

Yet another object of the invention is to provide an apparatus and method for monitoring customer generated trouble reports and generating notification to alert key personnel or management that outages (i.e. troubles) exist that have exceeded predefined time limits or intervals.

Still another object of the invention is to provide an apparatus and method for monitoring customer or subscriber generated trouble reports that includes a flexible, table driven architecture which provides the ability to automatically escalate to all levels of management at predetermined intervals.

Another object of the invention is to satisfy customer requirements for timely, proactive and documented internal escalations, and to permit escalation intervals, pager numbers, notification messages, and other parameters to be customized through a user-maintained configuration table.

Accordingly, the present invention throughout its features and aspects is designed to monitor the progress of customer generated trouble reports or tickets during the life of those reports in a telecommunications or special services environment. In accordance with an aspect of the invention, an apparatus and method are provided for monitoring customer generated trouble tickets and for notifying appropriate management levels or personnel when predefined thresholds of time are exceeded. The predefined thresholds may be controlled at a special service center level. The notification that is generated may comprise an alphanumeric or digital page, an e-mail message, an X-Window terminal message and/or other types of electronic messages containing various information, including the ticket number, escalation level, date and time received, service type, customer name, current status and the initials of the technician involved in the service restoration effort. In addition to paging notifications, printed escalation reports may be generated and provided to management or service personnel.

According to another aspect of the present invention, a Work and Force Administration-Control (WFA/C) Operational Support System (OSS) may be utilized to monitor the workload and individual trouble ticket history. Pager notifications may be noted in a trouble ticket log of the WFA/C for audit trial purposes. The present invention may also be designed to automatically transmit the proactive alert message across an electronic bonding (EB) gateway to notify EB customers (i.e., customers that share or receive electronic ticketing or report information) that proactive escalation has occurred. Further, escalation intervals, paging numbers, notification messages, and other parameters may be customized through user-maintained configuration tables.

According to an aspect of the present invention, an alerting system is provided. The alerting system proactively ensures awareness of data satisfying predetermined alerting criteria. The alerting system includes a manager module and an alerting module. The manager module periodically monitors the data to determine whether the data satisfies the predetermined alerting criteria. The alerting module sends an alert to a recipient when the manager module determines the data satisfies the predetermined alerting criteria.

According to a preferred embodiment, the alerting system also includes a parsing module which parses the data to remove extraneous and invalid information. The parsing module also organizes the data into data records according to a predefined format. The parsing module then transmits to the manager module at a predefined interval, the data records organized according to the predefined format, for monitoring by the manager module.

According to a preferred embodiment, the data includes pending customer generated trouble tickets. Moreover, the predetermined alerting criteria is at least one time interval.

Furthermore, each pending customer generated trouble ticket satisfies the alerting criteria when the trouble represented by the pending customer generated trouble ticket has not been resolved within a time period defined by the time interval. The alerting system may also include a report generator which generates a report logging each alert sent by the alerting module along with corresponding alert information. The alert information includes the alert recipient, a trouble ticket number corresponding to the pending customer generated trouble ticket causing the alert, and the time the alert was sent.

According to a preferred embodiment, the alerting module also includes an error manager module and a notification system which alerts the recipient. The error manager module informs the notification system of the alert recipient and the corresponding alert information, and transmits information to the report generator. The predetermined alerting criteria may include at least one time interval. Each time interval corresponds to an escalation level. Moreover, a user may define at least one recipient for each escalation level.

The alerting system also includes configuration files, such as a center alert file and a center data file. The center alert file stores alert information particular to a service center. The alert information includes alert recipient information for each escalation level. The center data file stores ticket information particular to the service center. The ticket information specifies the alerting criteria for each escalation level. In a preferred embodiment, the manager module discerns a service center associated with the data and determines if the data satisfies the alerting criteria corresponding to the customer service center. The determination is made by reading the data and querying the center data file corresponding to the service center identified in the data to determine whether the data should be monitored. If the data should be monitored, the manager module determines the alerting criteria from the center data file. If the data satisfies the alerting criteria, then the center data file queries the center alert file to determine the alert recipient. Moreover, a user may input updated alert information and updated ticket information into the configuration files at any desired time. Accordingly, the updated alert information and updated ticket information becomes effective when the manager module process the next trouble ticket.

The predefined interval is the time required for organizing the data into one complete data record. Sending an alert to the recipient can be via either emailing, paging, or transmitting messages across an electronic bonding gateway.

The data may include pending customer generated trouble tickets. Moreover, the parsing module determines whether each pending customer generated trouble ticket is related to a preceding pending customer generated trouble ticket. If a relationship is determined, the parsing module does not generate a data record for the subsequent pending customer generated trouble ticket.

The alerting system may also include a system alert file which stores information relating to a system administrator who will receive an alert if a system error occurs. The system error can be either the manager module receiving no data for one hour, the parser discerning an invalid specific service center, the manager module receiving an invalid entry from the center alert file or the manager module receiving an invalid entry from the center data file.

An alerting system is also provided for proactively ensuring awareness of pending customer generated trouble tickets which have not been resolved for at least a predetermined time corresponding to an escalation level. The time is selected by a customer service center. The alerting system includes a manager module and an alerting module. The manager module periodically monitors the pending customer generated trouble tickets to determine whether each pending customer generated trouble ticket remains unresolved for the time corresponding to the escalation level. The alerting module sends an alert to a recipient assigned to the escalation level when the manager module determines the pending customer generated trouble ticket remains unresolved for the time corresponding to the escalation level. The alerting system may also include a report generator which generates a report logging each alert sent by the alerting module. The alerting module includes an error manager module and a notification system which sends the alert to the recipient. The error manager module informs the notification system of the alert recipient along with corresponding information. The error manager module also transmits report information to the report generator.

The alerting system may also include configuration files including a center alert file and a center data file. The center alert file stores alert information particular to a service center. The alert information includes the alert recipient for the escalation level. The center data file stores ticket information particular to the service center. The ticket information specifies which pending customer generated trouble ticket the manager module monitors and the alert criteria corresponding to the escalation level. Preferably, the manager module discerns a service center associated with the pending customer generated trouble ticket and determines if the pending customer generated trouble ticket has achieved the escalation level defined by the customer service center. The determination is made by reading the pending customer generated trouble ticket and querying the center data file corresponding to the service center identified in the pending customer generated trouble ticket to determine whether the pending customer generated trouble ticket should be monitored. If the pending customer generated trouble ticket should be monitored, the manager module determines the predetermined time corresponding to the escalation level from the center data file. If the pending customer generated trouble ticket remains unresolved for the predetermined time, then the center data file queries the center alert file to determine the alert recipient.

The alerting system may also include a trouble ticket generating system which receives trouble ticket information from a plurality of sources and periodically transmits aggregated trouble ticket information to the manager module for monitoring. The alerting system may also include a parsing module. The parsing module parses the pending customer generated trouble tickets to remove extraneous and invalid information. The parsing module further organizes the pending customer generated trouble tickets into data records according to a predefined format. The parsing module also transmits to the manager module at a predefined interval, the data records organized according to the predefined format, for monitoring by the manager module. The parsing module determines whether each pending customer generated trouble ticket is related to a preceding pending customer generated trouble ticket. If a relationship is determined, the parsing module generates only one data record for all related pending customer generated trouble tickets. A system alert file may also be provided, which stores information relating to a system administrator who will receive an alert when a system error occurs.

According to another aspect of the present invention, an alerting method is provided. The alerting method proactively ensures awareness of pending customer generated trouble tickets remaining unresolved for at least a predetermined time corresponding to an escalation level. The alerting method includes monitoring each pending customer generated trouble ticket. The method also includes determining whether the monitored pending customer generated trouble ticket has been unresolved for at least the predetermined time corresponding to the escalation level. When the pending customer generated trouble ticket is determined to be unresolved for a duration longer than the predetermined time, an alert is sent to a recipient assigned to the escalation level.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Referring to the accompanying drawings, a detailed description of the preferred embodiments, features and aspects of the present invention will be provided.

The present invention relates to an apparatus and method for monitoring customer or subscriber generated trouble reports or tickets in a telecommunications or special services environment. The present invention, through its various features and aspects, provides a management tool to alert recipients of trouble tickets having exceeded predefined time interval(s) without service resolution or repair. According to an aspect of the present invention, notification may be sent to an appropriate management level or service personnel when the predefined time interval is exceeded. Alternatively, or in addition, the alert recipient may be a log file, in which case the appropriate management level or service personnel is apprised of the alert when reviewing the log file.

In a preferred embodiment, the notification comprises an alphanumeric or digital page, an e-mail message, or an X-Windows terminal display message. Of course, other types of electronic messages may be also be used. The notification may contain various information, including the trouble ticket number, an escalation level, the date and time the ticket was first entered into the WFA system, the service type having trouble, customer name, current status of the ticket and the identification (e.i. initials) of the technician involved in the service restoration effort.

Escalation levels may be defined based on the trouble ticket remaining unresolved for a time exceeding user specified time intervals. The escalation levels also control which management level or personnel will receive the alerting message or page notification. Thus, different recipients may be alerted when different time intervals are exceeded. The escalation intervals, pager numbers, notification messages, and other parameters may be customized through user-maintained configuration files.

Pumba System Architecture Overview

Figure 1:
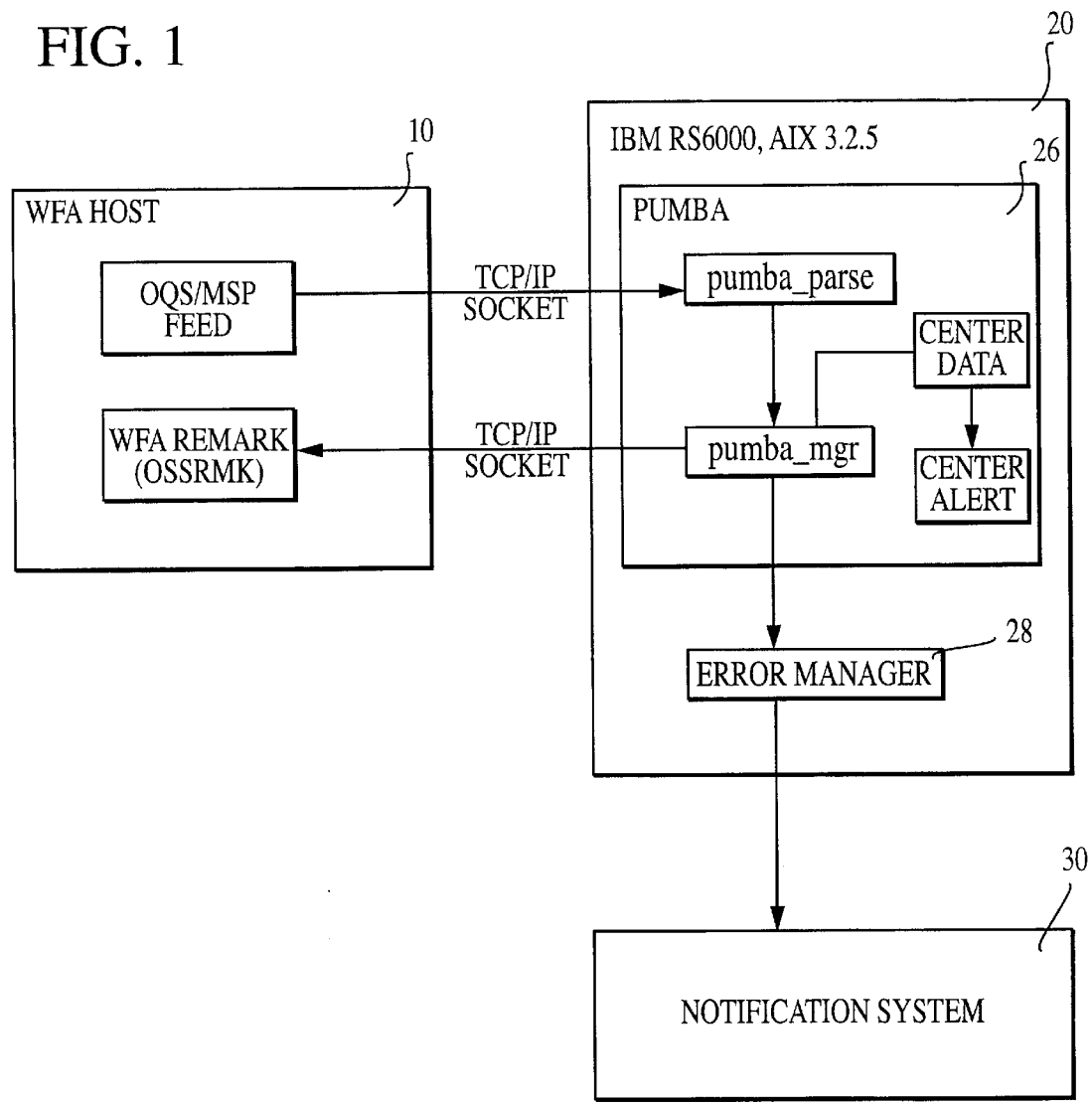
FIG. 1 illustrates, in block diagram form, an exemplary system architecture in which the present invention may be implemented.

The features and aspects of the present invention may be implemented by any suitable combination of hardware, software and/or firmware. An exemplary implementation of the present invention is illustrated in FIG. 1. According to the embodiment shown in FIG. 1, the invention comprises a software application 26 (referred to as "PUMBA" in the drawings) operating on a computer 20 such as a mainframe or minicomputer. Preferably, the mainframe 20 runs a UNIX operating system, although any multi-tasking operating system may be substituted. By way of a non-limiting example, mainframe 20 may be implemented with an IBM RS6000 running an Advanced Interactive eXecutive (AIX) V3.2.5 or greater operating system. In addition, mainframe 20 should include sufficient storage capacity to maintain all necessary programs and files. For example, a minimum of 5 Mb of disk storage may be provided; however, the storage capacity should be adjusted based on the size and number of programs and files being maintained. The present invention is not limited to the implementation illustrated in FIG. 1 because other arrangements and system implementations may be provided. For example, mainframe 20 may be interconnected (e.g., through a Local Area Network (LAN) or another type of network architecture) to other mainframes. Therefore, if different software modules reside on different mainframes 20, then information may be sent therebetween via an intersystem communication link such as a communication network (e.g., a LAN) or other suitable transmission link. Consequently, all executable components of the PUMBA software application 26 do not have to execute or even be stored on the same mainframe.

A ticket reporting and tracking system 10 should be provided for inputting trouble tickets and do keeping track of the tickets status in the repair process. Customers or subscribers experiencing trouble with subscription services or special services (e.g., a private line service or other telecommunication service) may contact personnel at designated special service centers (not shown). The service center personnel then generates a trouble report or ticket and transmits the trouble ticket into the ticket reporting and tracking system 10 through the use of a modem, TCP/IP connectivity and/or other components providing system connectivity. Subsequent to the initial entry, service center personnel may access the trouble ticket and transfer ticket information to the ticket reporting and tracking system 10, for example to update the trouble ticket status. The information contained in the trouble report stored in the ticket reporting and tracking system 10 may be provided to the PUMBA software application 26 via a TCP/IP socket or other suitable communication means. By way of a non-limiting example, the ticket reporting and tracking system 10 can comprise a Work and Force Administration (WFA) or Work and Force Administration/Control (WFA/C) Operational Support System (OSS), which is a software product available from Bell Communications Research (Bellcore), Murray Hill, N.J. For information concerning WFA/C, see "Work Force and Administration—WFA Control", Bellcore Practice BR190-513-323, which is expressly incorporated herein by reference in its entirety. Preferably, the WFA system comprises a WFA host 10 where all the information is stored, and at least one WFA client (not shown) which inputs the information into the WFA host 10.

The WFA host software of the ticket reporting and tracking system 10 may reside on a computer, such as an IBM 3270 mainframe. Alternatively, a similar hardware platform may be substituted. One or more WFA systems 10 may be provided for reporting and tracking customer trouble tickets. Further, the TCP/IP socket between the WFA host of each system 10 and the PUMBA application 26 of mainframe 20 may be implemented through a suitable communication network or connection (such as a LAN). Trouble report information may be set from the WFA host on a periodic basis (e.g., every thirty minutes in a preferred embodiment) to the PUMBA application 26 via the connection.

According to an aspect of the invention, the trouble report information may be provided to the PUMBA application 26 by an On-line Query System (OQS) and Manager Scratch Pad (MSP) feed from the WFA host of system 10. The On-line Query system is a report system within the WFA system. The OQS system transmits data to the MSP. The MSP is a tool which allows manipulating the data received from the OQS.

The PUMBA application 26 may comprise various configuration files (described in greater detail below) and two executable files (e.g., "pumba_parse" and "pumba_mgr") for performing parsing and managing procedures. When a report is received by the PUMBA application 26, the parsing module (i.e., "pumba_parse") first processes the incoming report information by removing extraneous information and invalid ticket information. The remaining data is then formatted into individual data records and sent to a managing or manager module (i.e., "pumba_mgr") of the PUMBA application. As indicated above, the PUMBA application 26 may be designed to receive reports from the WFA host on a known, consistent time interval (e.g., every thirty minutes). The interval should be predefined at the discretion of a system administrator and should be publicly known because a configuration data file, for alerting, contains time periods for alerting based upon this predefined interval. An exemplary flow chart of the operations and functions of the parsing module for the PUMBA application 26 is described below with reference to FIG. 2.

In a preferred embodiment, when the manager module (e.g., "pumba_mgr") of the PUMBA application 26 receives data records from the parsing module, the data records are stored in both volatile memory and permanent disk space of the mainframe 20. The time an alert was sent and the corresponding escalation level for each data record is maintained in memory. By keeping track of when an alert was sent for each escalation level, duplicate alerts for each escalation level can be prevented.

The PUMBA manager module evaluates each data record against a configuration data file to determine if an alert should be transmitted. The configuration data file may be provided for each service center. Thus, the manager module discerns the service center specified in each data record to determine which configuration data file is to be queried. When it is determined that the time duration or other alerting criteria has been satisfied, the managing module requests an alert to be sent to the appropriate personnel via an error manager module 28 preferably stored on the mainframe 20. An exemplary flow chart of the operations and functions of the manager module of the PUMBA application 26 is described below with reference to FIGS. 3A and 3B.

The error manager 28 may be implemented with software and is responsible for generating an alert message or notification through, for example, a notification system 30, as shown in FIG. 1. To facilitate page notifications, the notification system 30 may comprise a paging server or other suitable components for generating a page to specified management levels or personnel. In addition, the notification system 30 may include a mail server, a network-based windowing system and other system software and components for generating e-mail messages and other types of notification. By way of a non-limiting example, a standard UNIX-based mail system may be provided to send e-mail messages. Alternatively, the internal mail system of, for example, WFA may be used to send messages (in which case, the notification system 30 interfaces with the WFA host). In addition, printouts of alert message may also be provided to personnel, and logged in the WFA host by the PUMBA manager module via an intersystem connection such as a TCP/IP socket connection (see, e.g., FIG. 1). By way of a non-limiting example, OMAIL (which is an internal mail process or function of WFA) of the WFA host of system 10 may be used to send notification to personnel and to printout alert messages at a designated printing center (not shown in FIG. 1).

The present invention may also transmit the proactive alert message across an electronic bonding (EB) gateway in order to notify EB customers (i.e., customers that share or receive electronic ticketing or report information) that proactive escalation has occurred. An EB gateway is a gateway to a system which certain customers may use to monitor the status of their trouble tickets. Interaction with the EB gateway (not shown) may be handled by the WFA host of the system 10. When an alert message is posted to the WFA log by the PUMBA manager module, a CUS (customer remark) function of the WFA may be configured to send the posted alert message to the designated EB customer across the EB gateway interface. As a result, EB customers may be informed of alert messages on a timely basis.

Pumba System Architecture Overview

In accordance with an aspect of the present invention, the PUMBA application 26 may comprise several primary application components residing on one or more mainframes 20. These components may be programmed with any high level language such as C or PASCAL. As noted above, the PUMBA application 26 may include two executable modules for parsing and performing management functions (i.e., "pumba_parse" and "pumba_mgr"). In addition, the PUMBA application 26 may include several configuration files containing operational information and parameters. The configuration files may include a configuration file for system administrator alerting (e.g., a "system alert file"), and two configuration files for each service center being monitored (e.g., a "center data file" and a "center alert file"). A flag file may also be provided to indicate whether or not to post remarks to the WFA host's log. If the flag file does not exist, then no posting will be performed.

Executable Files

The PUMBA parse module (e.g., "pumba_parse") is a software tool for dissecting and processing the data received from the OQS report into individual data (ticket) records. In a preferred embodiment, the parse module of the PUMBA application 26 strips off extraneous header information in the OQS reports, and then filters incorrectly formatted data prior to transmitting the relevant OQS report information to the PUMBA manager module (e.g., "pumba_mgr").

Each OQS report should be for a specific service center. Thus, each report should uniquely identify a service center name. The service center information provides the ability to uniquely handle the same ticket type based on differing service center needs. After the parsing module filters the report data, the parsing module sorts the report data into a predefined format i.e., a data record, for transmitting to the managing module. By way of a non-limiting example, in a preferred embodiment the format of each data record transmitted to the managing module from the parsing module includes the following fields:

SSC—Special Service Center name (11 characters)
Customer Name (7 characters)
Circuit Format (1 character)
Circuit Type (3 characters)
Date (11 characters)
Time (5 characters)
Ticket Number (8 characters)
Status (3 characters)
Position (3 characters)
Age (6 characters)
Function Location Code (3 characters)
Service Code (3 characters)
Ignore Flag (1 character)

The SSC field is eleven characters in length and indicates the name of the special service center associated with the data record. The customer name field is seven characters in length and indicates the name of the customer or subscriber of the special service. Various information fields may also be provided to indicate, for example, the type and kind of special service that is present. For example, a circuit format field may be provided that has one or more characters to identify (e.g., by a predefined character code) the circuit format of the special service (e.g., private line service, PBX service, etc.). A circuit type field may also be provided that has three or more characters to identify (e.g., by a predefined character code) the circuit type of the special service (e.g., digital service, analog data, analog voice, etc.). In order to more specifically define the special service, a service code field may also be provided to uniquely identify (e.g., with a predefined character code) the special service offering that is present.

As indicated above, other information may be provided in the ticket record data structure. For example, a date field may be provided that is, e.g., eleven characters in length, and indicates the date when the trouble ticket was generated or received by the WFA host. A time field may be five characters in length and indicates the time (e.g., in hours and/or minutes) when the trouble ticket was generated or received by the WFA host 10. A ticket number field may also be provided that is, e.g., eight characters in length, and indicates a number assigned to the trouble ticket. A status field may be provided to indicate (e.g., by a predefined character code) the status of the trouble ticket and/or progress of service handling of the same. A position field may also be provided to specifically identify (e.g., by initials or character code) the technician or service personnel/level assigned to the trouble ticket. An age field may be provided that is, e.g., six characters in length, and indicates the time duration of the trouble ticket (i.e., the duration of time that the trouble ticket has not been resolved or properly attended to by service personnel). The time duration of the age field may be indicated in hours and/or minutes, and measured from the time that the ticket was generated or received by the WFA host 10. A function level code field may be three characters in length and indicate (as assigned by the WFA) grouping of the ticket with other tickets so the tickets may be routed more efficiently. Lastly, an ignore flag field may be provided to indicate if the ticket should be ignored or skipped. The ignore flag field may be one character in length and when set to True or Yes, the ticket is ignored by the PUMBA managing module.

In addition, according to an aspect of the present invention, trouble tickets may be grouped according to a master ticket number. The master ticket number may be provided as an optional field within the OQS report and should be associated with each trouble ticket. In other words, trouble tickets within the OQS report, grouped with a master ticket number, may be grouped and processed by the parsing module into one ticket record. The parsing module combines the trouble tickets having the same master ticket number by simply checking if a trouble ticket has a master ticket number and if the trouble ticket has one, comparing the master ticket number to the master ticket number of the previously processed trouble ticket. If the master ticket numbers are identical, the data in the second trouble ticket is ignored. Ordinarily, the parsing module transmits the data record to the managing module after the data record is complete, i.e., after all information in the trouble ticket is sorted. However, when a master ticket number is detected, in a preferred embodiment, the data record is not transmitted until a trouble ticket is detected having a different of no master ticket number.

Figure 2:
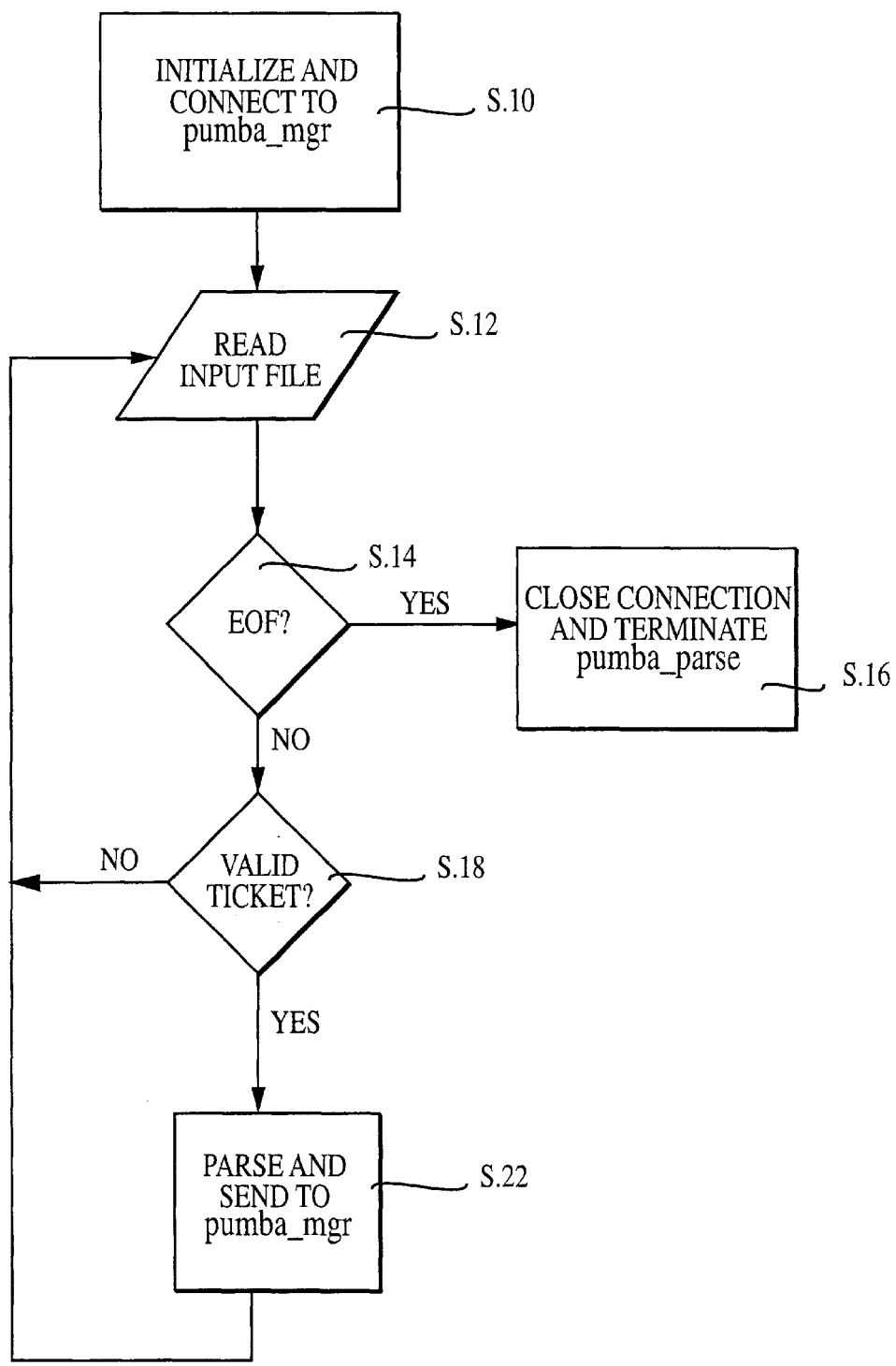
FIG. 2 is an exemplary flow chart of the processes and operations of a parse module of the present invention.

FIG. 2 illustrates an exemplary flow chart of the various processes and operations that may be performed by the PUMBA parsing module. Generally, parse processing, according to an aspect of the invention, includes the following operations and functions: (a) supplying the raw report data from the OQS of the WFA host to the PUMBA parsing module; (ii) establishing a TCP/IP socket connection between the PUMBA parsing module and the PUMBA manager module (e.g., when the parsing module and manager module are not provided on the same mainframe); (iii) first parsing each line of the OQS report file for the service center name, then parsing for the remaining trouble ticket data; (iv) transmitting, when the prior ticket does not have the same master ticket number information, the trouble ticket data via the TCP/IP connection to the PUMBA manager module; and (v) terminating the connections to the PUMBA parse module after receiving the end of the OQS report data file.

As discussed above, the OQS report file containing trouble ticket information may be sent from the WFA host of the ticket reporting and tracking system 10 to the parsing module of the PUMBA application 26 at predefined intervals. When ticket information is received, the PUMBA parsing module initializes itself and establish a connection to the PUMBA manager module at step S.10. If the parsing module and the manager module reside on different mainframes or systems, then a connection must be established to facilitate transfer of the ticket records to the manager module. The OQS report file is read by the parsing module at step S.12, to parse and extract the ticket information contained therein. After each line of the OQS report is parsed, it is determined whether the end of the report file is reached at step S.14. Each line of the OQS report file is parsed first for the service center name, and then for the remaining ticket data. During parsing, extraneous header information and non-ticket information may be filtered by the parsing module. When it is determined that a valid ticket is detected and parsed by the parse module at step S.18, the ticket record is sent to the PUMBA manager module at step S.22. Next, the next trouble ticket information is read at step S.12.

As noted above, tickets may be grouped according to a master ticket number, with the tickets which are to be grouped with a master ticket number being grouped and processed by the parse module into one ticket record. All of the tickets relating to a master ticket number may be parsed and grouped as one ticket record before the record is sent to the PUMBA manager module. If a prior ticket does not have the same master ticket information, the all relevant ticket data may be transmitted to the manager module.

If an invalid ticket is detected (i.e., a ticket with invalid or missing parameters, see step S.18), then the invalid ticket information is filtered out or skipped by the parse module and the file information is read at step S.12. When it is determined that the end of the file is reached at step S.14, the connection with the PUMBA manager module will be closed and the PUMBA parse module terminates at step S.16.

The PUMBA manager module (e.g., "pumba_mgr") is a software-based module that receives data records from the PUMBA parse module and stores the received data records in memory. For system integrity, the records may be stored by the manager module in both volatile memory and permanent memory of the mainframe 20. Accordingly, in the event of a system failure or a manager process restart, the records in permanent storage may be read back into the volatile memory for quicker processing. After a predetermined dormant period (e.g., six hours), the dormant trouble reports may be removed from permanent storage and no longer processed. Other features may also be provided to maintain system integrity. For example, if the manager module does not receive a trouble report from any service center for more than a predetermined period of time (e.g., one hour), the PUMBA manager module may page an administrator with a warning message via the error manager module 28 and notification system 30. The warning message indicates that the data input process may have a problem. The paging or alerting criteria may be maintained within a system alert file (described below).

When a new trouble ticket record is received from the parsing module, it is added by the manager module to a list of tickets to watch. At any one time, the manager module may be monitoring several or many tickets for each of the various service centers. Each trouble ticket should be added to the list even if it does not presently meet the alerting criteria defined in the configuration file of the associated service center. When the alerting criteria for a ticket is satisfied, then notification should be sent to the appropriate management or personnel. If desired, a record is made indicating that the alert was sent. As noted above, escalation levels may be defined to categorize alerting conditions and to send notification to an appropriate management level based on the time the trouble ticket has not been resolved. Increasing durations of non-resolution (e.g., that are detected based on the trouble ticket time duration) may be sent to higher levels of management or service personnel. According to a preferred embodiment, the alert message or notification that is sent includes the following information:

Ticket Number
Type Of Service Required
Customer
Ticket Duration
Status
Position
Received Date
Received Time The fields contained in the notification may be similar to the fields provided in the ticket record. That is, the ticket number field indicates the number of the trouble ticket, and the customer field indicates the name of the customer. The type of service required field indicates the circuit type of the special service (e.g., digital, analog voice, etc.). The status field indicates the status or progress of the ticket. The status field may indicate that the ticket was assigned to a technician, grouped with other tickets, or handed off to dispatch. The ticket duration field indicates the duration of time the trouble ticket has not been resolved, and the received date and received time fields indicate the date and time that the ticket was originally generated or received by the WFA host. Further, the position information field may indicate (e.g., by initials or predetermined code) the service personnel or technician assigned to the trouble ticket.

When the notification comprises a digital page, the page may contain less information then that indicated above; and, thus, digital paging may require the recipient that was paged to seek another communication channel in order to gather all of the pertinent information. For example, a digital page may be limited to contain only the escalation level (e.g., 1, 2, 3, 4, etc.) and the ticket number (which may be six digits or characters in length).

Figure 3A:
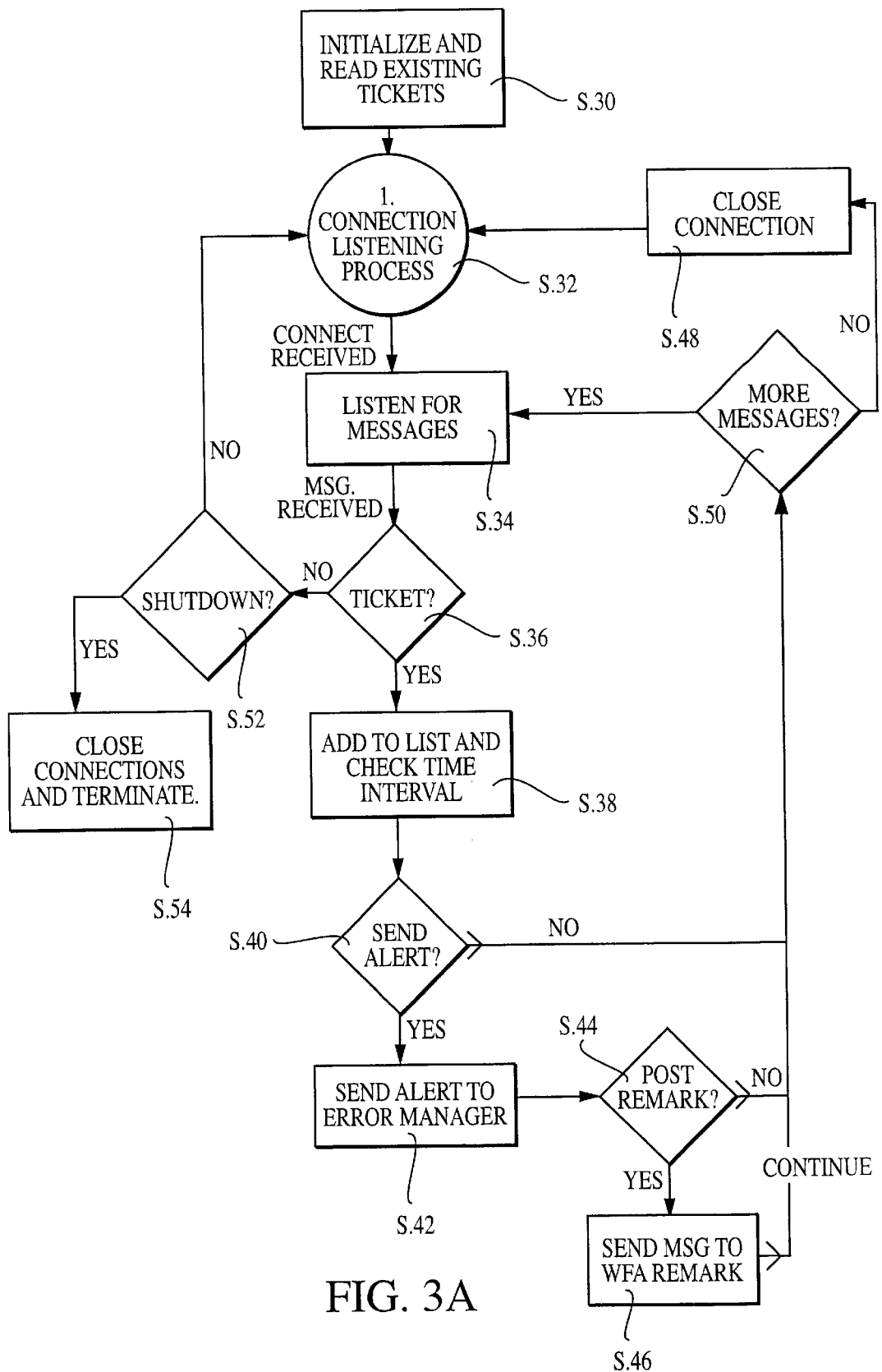
FIGS. 3A and 3B are exemplary flow charts of the processes and operations of a manager module of the present invention.
Figure 3B:
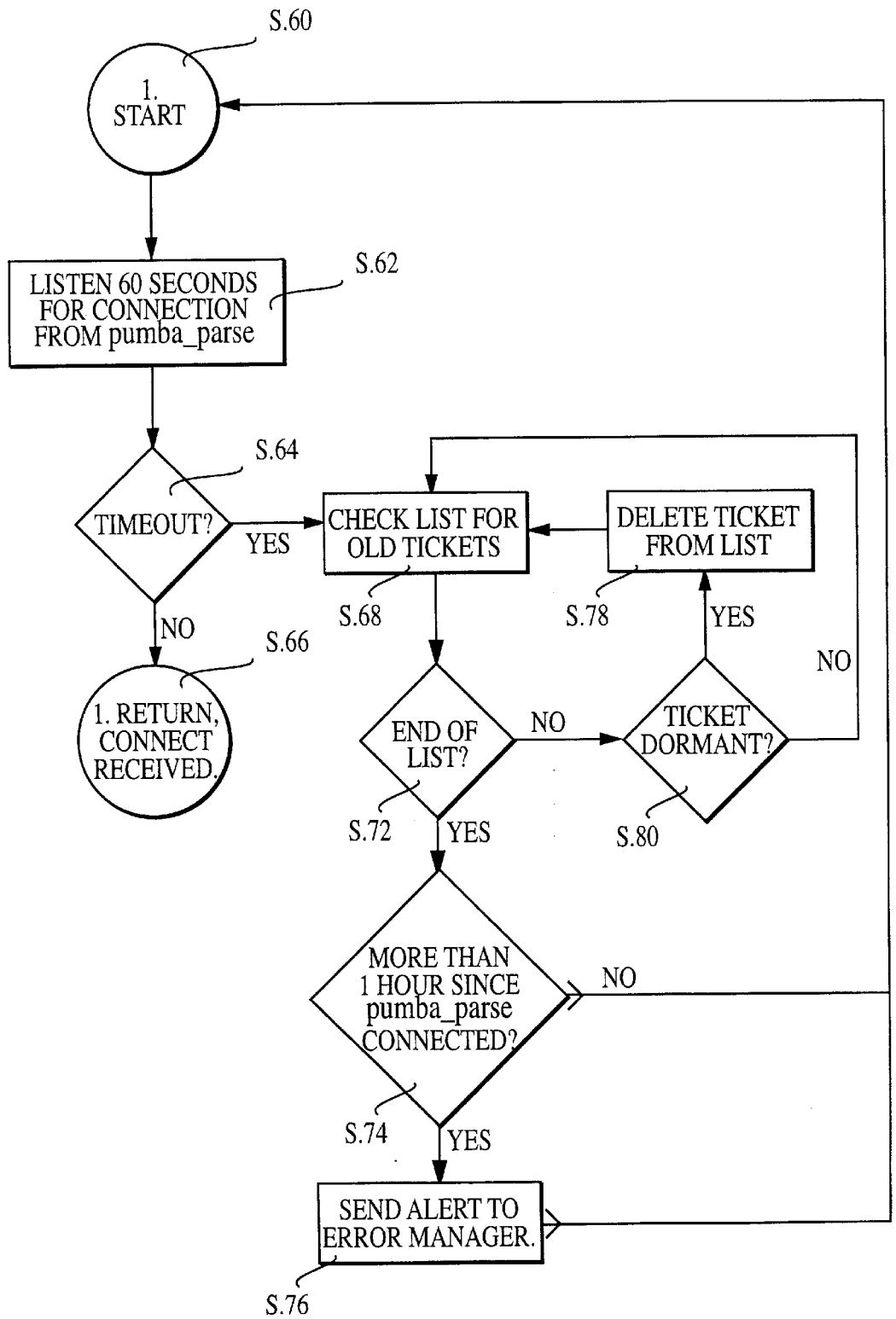

FIGS. 3A and 3B illustrate exemplary flow charts of the various processes and operations that may be performed by the PUMBA manager module. Generally, the PUMBA manager module, in accordance with an aspect of the invention, may perform various processes and operations, including: (i) reading in active or existing trouble tickets at startup; (ii) reading each ticket record received from the parse module; (iii) validating the alerting time interval or period for each ticket based on the configuration data file of the service center specified in the ticket; (iv) flagging as an alert if the ticket meets the defined alerting criteria; and (v) sending the flagged ticket to the alerting or paging process.

The PUMBA manager module monitors all active tickets based on the alerting criteria provided in the configuration files for the special service centers. Steps S.30–S.54 in FIG. 3A illustrate exemplary logic flow of the various processes and operations performed by the PUMBA manager module for monitoring tickets and alerting the appropriate personnel or management. In particular, at step S.30 the manager module initializes itself and reads existing tickets, i.e. reads trouble tickets that have already been alerted for a particular escalation level to prevent duplicative alerting. Then, at step S.32 a connecting listening process starts. Steps S.60–S.80 in FIG. 3B illustrate exemplary logic flow of the processes and operations for the connecting listening process. Then, at step S.34 the manager module listens for information (messages) being transmitted from the parsing module. After a message is received, at step S.36 the manager module determines if a valid data record (ticket) was received by validating all of the fields of the data record.

If a valid record was received, at step S.38 the new data record is added to a list (preferably a linked list) of data records and the time duration of the new data record is compared with escalation level information stored in a configuration file corresponding to the intended service center. If it is determined that the time duration corresponds to an escalation level at step S.40, then at step S.42 the manager module advises the error manager 28 that an alert should be sent. Subsequently, at step S.44 it is determined whether the alert should be logged. If the alert requires logging, at step S.46 a message is sent to the WFA along with the information being recorded. Otherwise, if the alert was determined not to require logging, or after the log message was sent at step S.46, the manager module determines whether any more messages are pending. If no more messages are pending, at step S.48 the connection to the parsing module is closed and then the process repeats from step S.32. If additional pending messages exist, the process repeats from step S.34.

If at step S.36 it is determined that a ticket was not received, at step S.52 the manager module decides whether to shut down, e.g., for weekly maintenance of the system. If it decides to shut down, the connection to the parsing module is closed and the manager module terminates execution at step S.54. Otherwise, the process repeats starting at step S.34.

Referring now to FIG. 3B, an exemplary flow of the connection listening process is described. At step S.62, the manager module listens for a period of time, sixty seconds in a preferred embodiment, for a connection from the parsing module. If a connection is found within the period of time, at step S.66 the process terminates and the information concerning the connection that was found is used to open a connection. Otherwise, at step S.68 when a timeout occurs, the list of data records is checked for old or dormant tickets, i.e., tickets in the manager module's list which are no longer in the OQS report. If the entire list has been checked for dormant tickets, at step S.74 the manager module determines if it has been more than a period of time (one hour in a preferred embodiment) since a connection has been made with the parsing module. If more than one hour has elapsed, at step S.76 the manager module sends an alert to the error manager 28 informing the error manager 28 of the lack of contact from the parsing module. Subsequently, or if less than one hour was determined to have elapsed at step S.74, the process repeats from step S.60.

If it is determined that the complete list has not been checked for dormant (outdated) tickets at step S.72, the manager modules determines whether the ticket is dormant at step S.80 by comparing the ticket to all the tickets in the latest set of data records received from the parsing module. If the ticket is dormant, at step S.78 the ticket is deleted from the list. Subsequently, and when the ticket is determined to be active, the process repeats from step S.68.

Configuration Files

As discussed above, the PUMBA application 26 may include two configuration files for each service center. The configuration files can also be stored on the mainframe along with the PUMBA executable files. When monitoring each data record, the two configuration files (i.e., the "center data file" and the "center alert file") must match the service center name provided in the header of the data record or ticket. Thus, the service center name must be part of the data record sent to the manager module. According to a preferred embodiment of the present invention, each of the configuration files may be edited while the PUMBA application is active, and the editing changes may become effective when the next report, after the files are updated, is received by the parsing module. The service centers may edit their files by connecting with the mainframe 20 (e.g. by TELNET) and by using an editor.

The configuration data file or center data file allows users to selectively identify data records to watch for alerting. Users may generalize the criteria for monitoring a data record or selectively watch a unique set of data records. Thus, the service center may elect to monitor only data records which are, for example digital lines, or data records having a certain function code. Each line of the center data file may be broken down into a predetermined number of fields (eleven in a preferred embodiment) as shown below.

Begin
End
Escalation Level
Alert Message
Name
Alert Method
Circuit Type
Service Code
Function Code
Status
Ignore Flag The begin field stores the age a ticket must be before an alert is sent for a particular escalation level. Then end field stores the age the ticket must be when alerting for the particular escalation level should end. The escalation level field stores the escalation level corresponding to the time interval stored in the begin and end fields. The alert message stores a code which relates to the center alert file and is described below. The name field stores the filename of a log file, if a log file is required. The alert method field stores the method to be used for alerting the recipient, such as paging, emailing, etc. The circuit type field, service code field, and ignore flag field are similar to the fields having the same names described above. The status field indicates where the ticket is in the repair process. Those four fields determine which tickets will be monitored. Exemplary lines of the center data file are:

180 210 1 XX00001 NONE ALL VGPL ALL ALL ALL NONE 240 260 2 XX00002 NONE ALL VGPL ALL ALL ALL NONE

In the first line above, escalation level 1 occurs when a trouble ticket has an age ranging from 180 to 210 minutes. The information in the fourth field, XX00001, is a reference code for determining the alert recipient and other information about the recipient from the center alert file. According to the NONE in the fifth field, no log file will be created, and the sixth field, ALL, indicates that all alert methods will be used. According to the VGPL, only voice grade private line (VGPL) trouble tickets will be monitored. And according to the seventh, eight, and ninth fields, trouble tickets having all service, function and status codes will be monitored. The last NONE indicates that the ignore flag is off. In the second line, all of the information in the fields is the same, except that the second line is for escalation level 2 ranging from 240–260 minutes, and XX00002 is referenced in the center alert file to determine the alert recipient and related recipient information.

In a preferred embodiment, the center alert file maintains a list of alert codes which match the alert messages in the configuration data file (e.g., the corresponding center data file). Each code may include information used by the alerting process to determine the valid paging days, time range, alert method, and alert recipient. Exemplary entries for lines within a center alert file are:

XX00001 UMTWRFS 05:00 17:00 ALPHA 5559999 AUSAPAGER
XX00002 UMTWRFS 05:00 17:00 ALPHA 5559999 AUSAPAGER

In the exemplary first line above, XX00001 refers to the reference code from the center data file, in the above example escalation level 1. The recipient, at pager number 555-9999 should be alerted between 5 am and 5 pm, Sunday through Saturday. The page is an alphanumeric page (ALPHA) and the paging company is represented by AUSAPAGER.

The configuration files of the PUMBA application 26 may also include a "system alert file" for alerting the system administrator. Administrator paging information may be provided in the system alert file and may comprise two basic alert types (e.g., "PUMBAE1" and "PUMBAE2"), the details of which may be defined by the PUMBA system administrator. In a preferred embodiment, a PUMBAE 1 alert may be initiated when no trouble ticket has been received for a predetermined period (e.g., one hour) from the WFA system 10. A PUMBAE 2 alert may be initiated when an undefined service center name is reported or when an invalid configuration data file entry is discovered. An examples of two system alert file entries are provided below.

```
PUMBAE1 UMTWRFS   07:30 16:15 ALPHA   "PAGER NUMBER"
PUMBAE2 MTWRF     07:00 17:00 XWIN    "XWINDOW DISPLAY"
```

In the first line above, when a PUMBAE 1 alert occurs, an alpha page is sent to "PAGER NUMBER" between 7:30 am and 4:15 pm, Sunday through Saturday. In the second line above, when a PUMBAE2 alert occurs, an X-Windows alert is sent to the "XWINDOWS DISPLAY" between 7 am and 5 pm, Monday through Friday.

In addition, daily log files may be provided to log monitoring and alerting activity. For this purpose, daily ASCII log files may be generated which log activity of the PUMBA parse module and PUMBA manager module.

While the invention has been described with reference to several exemplary and preferred embodiments, it is understood that the words which have been used herein are words of description and illustration, rather than words of limitations. Changes may be made, within the purview of the disclosure, as presently stated and as amended, without departing from the scope and spirit of the invention in its aspects.

For example, although the invention has been described with respect to increasing escalation levels as a result of a trouble ticket aging, other factors can cause an escalation. For example, the severity of repair work necessary can be indicated in the report, and more severe work can cause an escalation. Moreover, a combination of factors can cause an escalation. For example, level one difficult work and 2 hours old, may be one escalation level. Level two difficulty work and 3 hours old, may cause the next escalation level.

What is claimed is:

1. An alerting system for proactively ensuring awareness of data satisfying predetermined alerting criteria, the alerting system comprising:

a manager, implemented by a processor, that periodically monitors the data to determine whether the data satisfies the predetermined alerting criteria;

an alter, implemented by a processor, that sends an alert to a recipient, the recipient being assigned to an escalation level when the manager determines a pending customer generated trouble ticket remains unresolved for a time corresponding to the escalation level; and a parser, implemented by a processor, that parses the data to remove extraneous and invalid information and that organizes the data into data records according go a predefined format, the parser transmitting to the manager at a predefined interval, the data records organized according to the predefined format, for monitoring by the manager.

2. The alerting system of claim 1, further comprising a report generator which generates a report logging each alert sent by the alerter along with corresponding alert information.

3. The alerting system of claim 2, in which the alert information comprises the recipient of the alert, a trouble ticket number corresponding to the pending customer generated trouble ticket causing the alert, and a time the alert was sent for each escalation level, wherein duplicate alerts for each escalation level are prevented.

4. The alerting system of claim 2, in which the alerter comprises an error manager and a notifier which alerts the recipient, the error manager informing the notifier of the recipient of the alert and the corresponding alert information, and transmitting information to the report generator.

5. The alerting system of claim 1, in which there are a plurality time intervals that each corresponds to one of a plurality of escalation levels, and in which a user defines at least one recipient for each escalation level.

6. The alerting system of claim 5, further comprising configuration files comprising:

a center alert file which stores alert information particular to a service center, the alert information comprising alert recipient information for each escalation level; and a center data file which stores ticket information particular to the service center, the ticket information specifying the predefined time interval for each escalation level.

7. The alerting system of claim 6, in which the manager discerns the service center associated with the trouble ticket and determines if the trouble ticket has exceeded the time interval without one of service resolution and repair corresponding to the customer service center by reading the trouble ticket and querying the center data file corresponding to the service center identified in the trouble ticket to determine whether the trouble ticket should be monitored, wherein, when the trouble ticket should be monitored, the manager determines the time interval from the center data file, and wherein when the trouble ticket has exceeded one of the time intervals without one of service resolution and repair, then the center data file queries the center alert file to determine the recipient of the alert.

8. The alerting system of claim 7, in which a user inputs updated alert information and updated ticket information into the configuration files at any desired time and the updated alert information and updated ticket information becomes effective when the manager process a next trouble ticket.

9. The alerting system of claim 7, further comprising a system alert file which stores information relating to a system administrator who will receive an alert if a system error occurs, the system error comprising either the manager receiving no data for predefined period, the parser discerning an invalid specific service center, the manager receiving an invalid entry from the center alert file or the manager receiving an invalid entry from the center data file.

10. The alerting system of claim 1, in which the predefined interval is the time required for organizing the data into one complete data record, and in which the alert to the recipient comprises one of emailing, paging, and transmitting messages across an electronic bonding gateway.

11. The alerting system of claim 1, in which the pending trouble tickets further comprise pending customer generated trouble tickets, and in which the parser determines whether each pending customer generated trouble ticket is related to a preceding pending customer generated trouble ticket, wherein if a relationship is determined, the parser does not generate a data record for the subsequent pending customer generated trouble ticket.

12. An alerting system for proactively ensuring awareness of pending customer generated trouble tickets which have not been resolved for at least a predetermined time corresponding to an escalation level, the time being selected by a customer service center, the alerting system comprising:

a manager, implemented by a processor, which periodically monitors the pending customer generated trouble tickets to determine whether each pending customer generated trouble ticket remains unresolved for the time corresponding to the escalation level;

an alerter, implemented by a processor, which sends an alert to a recipient, the recipient being assigned to the escalation level when the manager determines the pending customer generated trouble ticket remains unresolved for the time corresponding to the escalation level; and a report generator, implemented by a processor, that generates a report logging each alert sent by the alerter.

13. The alerting system of claim 12, in which the alerter comprises an error manager and a notifier which sends the alert to the recipient, the error manager informing the notifier of the alert recipient along with corresponding information, and transmitting report information to the report generator.

14. The alerting system of claim 12, further comprising configuration files comprising:

a center alert file which stores alert information particular to a service center, the alert information comprising the alert recipient for the escalation level; and a center data file which stores ticket information particular to the service center, the ticket information specifying which pending customer generated trouble ticket the manager monitors and the alert criteria corresponding to the escalation level.

15. The alerting system of claim 14, in which the manager discerns the service center associated with the pending customer generated trouble ticket and determines if the pending customer generated trouble ticket has achieved the escalation level defined by the customer service center by reading the pending customer generated trouble ticket and querying the center data file corresponding to the service center identified in the pending customer generated trouble ticket to determine whether the pending customer generated trouble ticket should be monitored, wherein if the pending customer generated trouble ticket should be monitored, the manager determines the predetermined time corresponding to the escalation level from the center data file, and wherein when the pending customer generated trouble ticket remains unresolved for the predetermined time, then the center data file queries the center alert file to determine the alert recipient.

16. The alerting system of claim 12 further comprising a trouble ticket generating system which receives trouble ticket information from a plurality of sources and periodically transmits aggregated trouble ticket information to the manager for monitoring.

17. The alerting system of claim 12, further comprising a parser which parses the pending customer generated trouble tickets to remove extraneous and invalid information and which organizes the pending customer generated trouble tickets into data records according to a predefined format, the parser transmitting to the manager at a predefined interval, the data records organized according to the predefined format, for monitoring by the manager.

18. The alerting system of claim 12, further comprising a system alert file which stores information relating to a system administrator who will receive an alert when a system error occurs.

* * * * *

UNITED STATES PATENT AND TRADEMARK OFFICE
CERTIFICATE OF CORRECTION

PATENT NO. : 6,763,333 B2
DATED : July 13, 2004
INVENTOR(S) : W. R. Jones et al.

It is certified that error appears in the above-identified patent and that said Letters Patent is hereby corrected as shown below:

Column 15,
Line 50, "alter" should be -- alerter --.
Line 57, "go" should be -- to --.

Signed and Sealed this

Twenty-first Day of June, 2005

JON W. DUDAS
*Director of the United States Patent and Trademark Office*